June 7, 1960 E. B. LUTTRELL 2,939,441
COMBINATION TWO CYCLE INTERNAL COMBUSTION ENGINE AND TURBINE
Filed March 3, 1958 2 Sheets-Sheet 1

INVENTOR.
EARL B. LUTTRELL
BY
Att'y.

June 7, 1960 E. B. LUTTRELL 2,939,441
COMBINATION TWO CYCLE INTERNAL COMBUSTION ENGINE AND TURBINE
Filed March 3, 1958 2 Sheets-Sheet 2
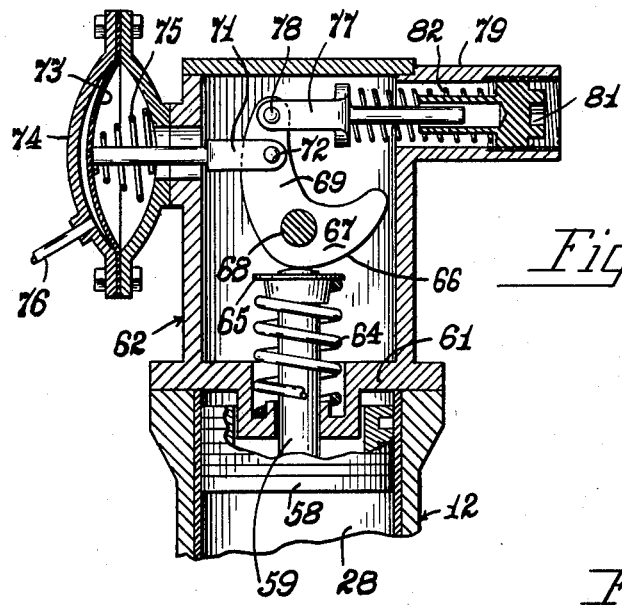
INVENTOR.
EARL B. LUTTRELL
BY ವಿಚ United States Patent Office 2,939,441
Patented June 7, 1960

2,939,441

COMBINATION TWO CYCLE INTERNAL COMBUSTION ENGINE AND TURBINE

Earl B. Luttrell, Sandwich, Ill., assignor to Luttrell Engineering Corp., Sandwich, Ill., a corporation of Illinois Filed Mar. 3, 1958, Ser. No. 718,627

5 Claims. (Cl. 123—70)

The invention relates to improvements in reciprocating two-cycle gasifier engines and more particularly to the novel construction and operation of a two-cycle internal combustion engine having a pre-compression or charging chamber including automatically controlled means for regulating the pressure of the air or fuel-air mixture and auxiliary power generation means for utilizing the exhaust gases so as to obtain maximum benefit from the fuel consumed.

More specifically, the invention comprises the novel construction and operation of a two-cycle internal combustion engine fashioned with an auxiliary or charging cylinder and piston for pre-compressing and heating the air or fuel-air mixture delivered to the combustion chamber. Novel means also is provided to regulate the pressure in the charging chamber automatically so as to control the ratio between the fuel-air mixture pressure and the exhaust pressure and thereby maintain the fuel-air mixture pressure dominant at all times to facilitating scavenging of exhaust gases. The invention disclosed herein also includes novel means to utilize the pressure of the exhaust gases in the operation of the engine, thus reducing fuel consumption and increasing engine efficiency.

These features and advantages are obtained in the present disclosure by the provision of an auxiliary or charging chamber including a reciprocable charging piston which is connected directly to and operable upon rotation of the engine crank-shaft. The charging chamber also includes a reciprocable cylinder head movable toward and away from the charging piston in response to variations in the pressure of the engine exhaust gases so as to insure that the pressure of the fuel-air mixture is greater at all times than the pressure of the expended gases in the combustion chamber. Also, the exhaust gases from the combustion chamber of the engine are directed into a surge tank from where they flow under substantially uniform pressure to a turbine which is harnessed, by a conventional gear train, to the engine crank-shaft so as to insure complete utilization of all generated power.

It is therefore, an object of the invention to provide a novelly constructed efficient internal combustion engine.

Another object is to provide an internal combustion engine with novel means to pre-compress the air or fuel-air mixture supplied thereto.

Another object is to provide novel means to control the pressure of the fuel-air mixture through utilization of the flow of exhaust gases from the engine, so as to insure complete evacuation of exhaust gases from the combustion chamber during the inflow of the fuel-air mixture.

Another object of the invention is to provide novel means for utilizing the exhaust gases from an internal combustion engine in the operation of auxiliary power means.

The invention disclosed also contemplates the conversion of the engine from an internal combustion engine to a diesel engine or a low grade fuel burning diesel type gasifier, by the minor substitution of parts and it is therefore another object of the invention to provide such means.

With the foregoing and other objects in view which will appear as the description proceeds, the invention consists of certain novel features of construction, arrangement and combination of parts hereinafter fully described, illustrated in the accompanying drawings, and particularly pointed out in the appended claims, it being understood that various changes in the form, proportion, size and minor details of the structure may be made without departing from the spirit or sacrificing any of the advantages of the invention.

For the purpose of facilitating an understanding of the invention, I have illustrated in the accompanying drawings, preferred embodiments thereof, from an inspection of which, when considered in connection with the following description, my invention, its mode of construction, assembly and operation, and many of its advantages should be readily understood and appreciated.

Referring to the drawings in which the same characters of reference are employed to indicate corresponding or similar parts throughout the several figures of the drawings:

Figure 2 is a vertical sectional view of the control unit, taken on line 2—2 of Figure 1, and showing parts in elevation.

Figure 3 is a fragmentary vertical sectional view of the charging chamber showing it fitted with a stationary head used to adapt the engine to operation as a low grade fuel burning two-cycle internal combustion engine.

Figure 4 is a fragmentary vertical sectional view of the charging chamber showing it fitted with a stationary head used to adapt the engine for operation as a two-cycle internal combustion diesel gasifier.

Figure 1:
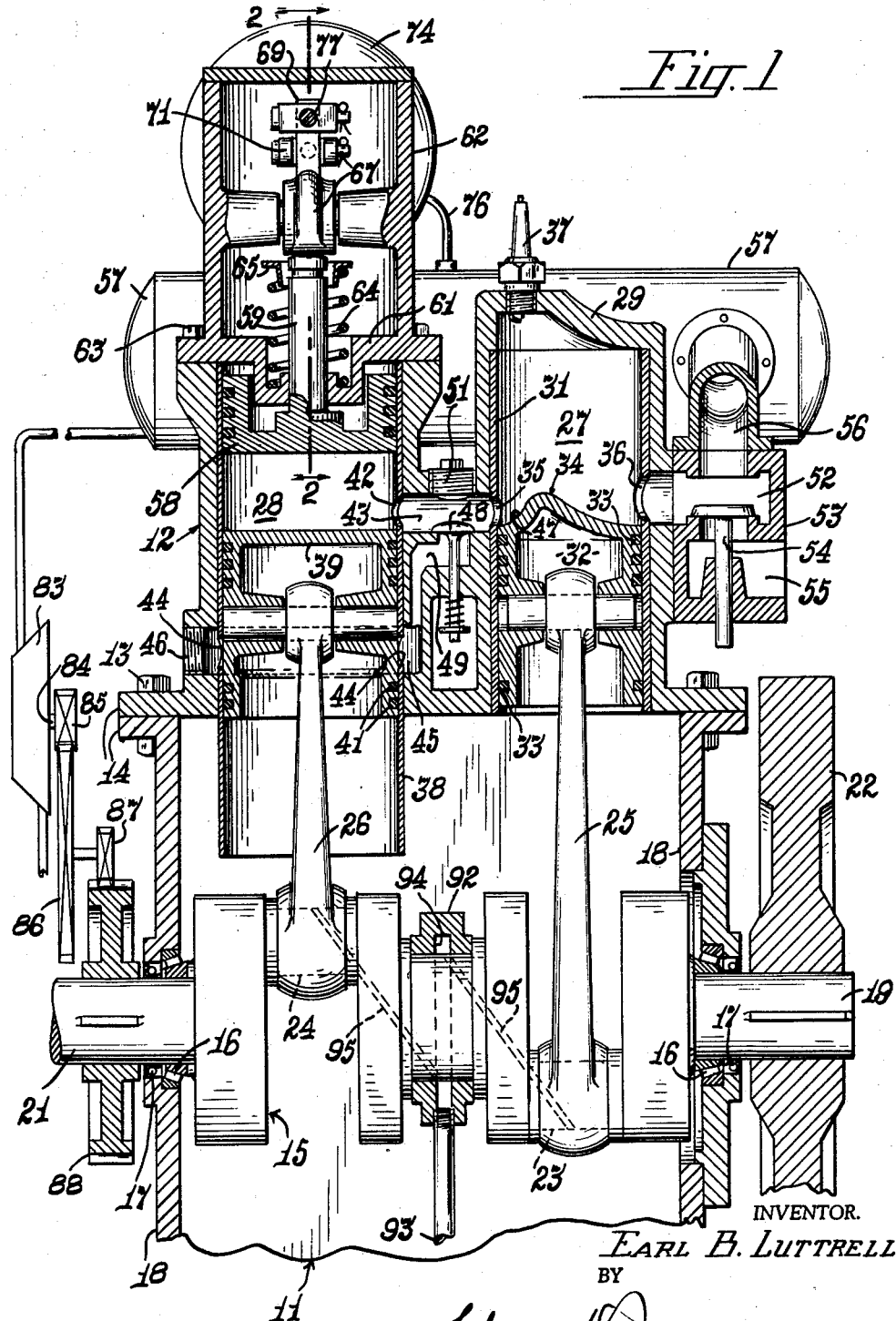
Figure 1 is a vertical central sectional view of a two-cycle one cylinder gasifier internal combustion engine embodying features of the present invention, showing some of its parts in elevation and other parts diagrammatically.

Referring to the accompanying drawings, and particularly to Figure 1, the one-cylinder reciprocating two-cycle internal combustion engine there illustrated comprises a crank housing 11 and a cylinder block 12 suitably joined into an integral whole in a conventional manner, such as by bolts 13 engaged in matching flanges 14. A crank-shaft 15 is journalled in the crank housing 11 and it has its ends extend through anti-friction bearings 16 and oil seals 17 mounted in the end walls 18 of said housing, so as to locate their respective and portions 19 and 21 outside of said housing. In the present disclosure, a fly wheel 22 is secured to the protruding shaft end 19, whereas the other end 21 constitutes the power take-off. The crank-shaft has a pair of diametrically opposed crank pins 23 and 24 to which the lower extremities of a pair of crank arms 25 and 26, respectively, are attached.

The cylinder block 12 has a pair of vertically arranged bores defining cylinders 27 and 28 in direct communication at their lower ends with the crank housing 11 and one in vertical alignment with each of the crank arms 25 and 26.

The cylinder 27 has a closure wall 29 at its upper end and it preferably is fitted with a stationary sleeve or liner 31 within which a piston 32 (hereinafter termed the combustion piston) carried on the upper end of the crank arm 25, reciprocates. The cylinder space above the piston constitutes a combustion chamber and the piston is provided with the usual compression and oil seal rings 33. In the disclosure, the combustion piston 32 is illustrated in the position assumed at the end of its power stroke which locates its top wall 34 beneath and clear of a fuel inlet port 35 and an exhaust outlet port 36.

In operation, as the piston 32 moves upwardly at the beginning of its compression stroke, its leading edge or head end 34 initially moves across and then closes the inlet port 35 thereby cutting off the flow of fuel delivered to the combustion chamber in a manner to be described presently. Such initial upward movement, as well as such additional movement upwardly as is required to effect closing of the outlet port 36, is effective (also described in detail later) to cause complete evacuation of any exhaust gases in the combustion chamber. As the combustion piston continues its upward movement the fuel-air mixture delivered prior to the closing of the inlet port 35, is compressed thereby and upon ignition thereof at the completion of such compression stroke, the fuel is ignited by a spark generated by spark plug 37, in a conventional manner. This drives the piston downwardly to rotate the crank-shaft and permit a charge of fuel to enter the combustion chamber and the escape of the exhaust gases, whereupon the cycle is repeated.

Air or a fuel-air mixture is delivered under pressure to the combustion chamber 27 through the inlet port 35 from the cylinder 28 which comprises a pre-compression or charging chamber. As shown, this cylinder is fitted with a sleeve or liner 38, the lower end of which extends downwardly into the crank housing 11 to form an extension of the cylinder and within which a charging piston 39 reciprocates. The piston 39 is carried on the upper end of the crank arm 26 and it also is provided at its upper region with conventional compression and with oil seal rings 41 adjacent its lower region.

The liner 38 has a port 42 therein spaced from the lower end thereof a distance to locate it above the top wall of the piston 39 when the latter is in its uppermost position as shown, so as to be open at all times. The port 42 is in direct communication with the combustion chamber inlet port 35 through a passage 43 formed in the cylinder block 12. Air or a fuel-air mixture is admitted into the charging chamber 28 through a plurality of circumferentially spaced intake ports 44 in the liner 38 which parts are opened when the charging piston 39 is in its lowermost or withdrawn position. A circumferential passage 45 in the cylinder wall registers with the ports 44. This passage has an inlet 46 to which is fitted an intake line or carburetor (not shown).

Insofar as the structure has been described hereinabove, the operation is substantially as follows: When the charging piston 39 is in its lower or withdrawn position, the fuel intake ports 44 are open thus admitting fuel into the charging chamber. At this time, the inlet port 35 to the combustion chamber is closed by the combustion piston 32 which is at the end of its compression stroke. When the fuel in the combustion chamber is fired, the combustion piston is driven downwardly, as described hereinabove, while the charging piston 39 moves upwardly to compress the fuel in the charging chamber. As soon as the downwardly moving combustion piston 32 starts to clear the exhaust port 36, the expended gas starts to flow out of the combustion chamber. Shortly following the initial opening of the exhaust port, the fuel inlet port 35 opens, thus allowing the fuel mixture in the charging chamber, and which fuel is now compressed by reason of the simultaneous advance of the charging piston 39, to flow into the combustion chamber under pressure. The flow of live fuel into the combustion chamber is deflected upwardly therein by reason of a deflector surface 47 on the end wall of the combustion piston 32 so as to follow the exhaust gases and urge them out of the now fully opened exhaust port 36 with but a minimum of commingling.

If desired, for efficiency and economy of operation, a spring controlled poppet valve 48 is arranged in the passage 43. This valve normally is closed and when opened, either by reason of atmospheric pressure or mechanical means during downward movement of the charging piston 39, it places the circumferential fuel passage 45 in direct communication with the passage 43 through a duct 49. This admits fuel into the evacuated charging chamber 28 through port 42 prior to the opening of the intake ports 44. The valve 48 may be omitted, however, its use is preferred because its presence in the duct 49 prevents fuel feed back through said duct to the circumferential passage 45 during the charging stroke of the piston 39. A plug 51 is provided in the wall of the passage 43 to admit access to the valve 48 for installation and servicing.

The engine disclosed herein also includes novel means to utilize the pressure of the exhaust gases flowing out of the combustion chamber exhaust port 36 to maintain the pressure of the fuel or air mixture in the charging chamber substantially uniform during its discharge and greater than the back pressure of the expended gases in the combustion chamber. This insures complete evacuation of the gases from the combustion chamber during the flow of fuel-air mixture thereinto. Such evacuation is accomplished by providing novel control means to be described presently, in the charging chamber which is responsive to the pressure of the exhaust gases leaving the port 36.

As shown in Figure 1, exhaust gases leaving the port 36 flow into a chamber 52 in a header 53 secured to the cylinder block in any approved manner. The chamber 52 includes a valve 54 normally closing a discharge opening 55 and which is adapted to be opened momentarily, manually or mechanically, during initial engine operation so as to insure rapid discharge of exhaust gases with minimum back pressure. As soon as the engine is operating efficiently, the valve 54 is closed, whereupon the exhaust gases flow from the chamber 52 through a conduit 56 and into a surge tank 57. The surge tank is adapted to accumulate the exhaust gases and maintain it under pressure due to the exhaust. The accumulated pressurized gases in the surge tank 57 is utilized to actuate the pressure control means in the charging chamber 28 and may be used also for the purpose of driving auxiliary means, hereinafter described, provided to use the energy thereof in driving the engine.

The novel pressure control means, shown in Figures 1 and 2, comprises a movable piston type of cylinder head 58 arranged for reciprocation in the upper end of the charging chamber 28 and in opposed relation to the charging piston 39. The cylinder head 58 includes an axial stem 59 that extends upwardly through the bottom wall 61 of a control housing 62 secured, as by bolts 63, to the upper end of the charging chamber 28. A spring 64, arranged around the stem 59 between the wall 61 and a flange 65 on said stem, normally urges the cylinder head 58 into its uppermost position no that the free upper end of said stem bears at all times against a cam surface 66 on an eccentric 67 journalled in the control housing, as at 68.

The eccentric 67 includes an arm 69 to which one end of a link 71 is secured, as at 72. The link 71 extends perpendicular to the axis of the stem 59 and it is secured at its other end to a diaphragm 73 enclosed in a bell-housing 74. An expansion spring 75 is coiled about the link 71, within the bell-housing, so as to normally urge the link and diaphragm outwardly into the position substantially as shown in Figure 2. A conduit 76, in communication at one end with the bell-housing 74 and at its other end with the surge tank 57, is adapted to transmit the pressure of the gases in the surge tank to the bell-housing so as to urge the diaphragm inwardly toward the control housing and rock the eccentric 67 in a clockwise direction.

Movement of the eccentric 67 in response to a given pressure on the diaphragm is regulated by novel preadjusted means comprising a spring pressed pin 77 pivotally secured at one end, as at 78, to the end of the eccentric arm 69, and having its other end extend into a hollow boss 79 on the control housing 62. The boss is internally threaded to receive for manual adjustment therein, a guide plug 81 in which the free end of the pin 77 is seated. Adjustment of the plug increases or decreases the resistance offered by a spring 82, on said pin 77, to turning movement of the eccentric 67 in response to the surge pressure on the diaphragm 73.

It should be obvious at this time that movement of the eccentric 67 adjusts the cylinder head 58 vertically to increase or decrease the capacity of the charging chamber 28 and to thereby increase or decrease the pressure of the fuel-air mixture delivered to the combustion chamber during engine operation. Because this fuel-air mixture pressure is controlled by the pressure in the surge tank resulting from the applied pressure of the flow of the exhaust gases, the fuel-air mixture pressure in the charging chamber always dominates the back pressure of the exhaust gases in the combustion chamber.

Furthermore, when the charging piston 39 reaches the end of its compression stroke, the fuel-air mixture pressure in the charging chamber partially overcomes the pressure of the surge gases on the diaphragm 73 with the result that the cylinder head 58 is moved upwardly to compensate for excessive compression and thus maintain the pre-selected pressure. As soon as the charging piston starts its downward movement, the pressure on the diaphragm simultaneously urges the cylinder head 58 downwardly so as to maintain substantial constant pressure on the fuel-air mixture during at least a substantial portion of its discharge through passage 43. This insures rapid, substantially uniform, flow of fuel into the combustion chamber and assures thorough scavenging of the exhaust gases with the result that the engine operates with utmost efficiency and economy.

As previously stated, the pressurized exhaust gases in the surge tank 57 is utilized also to drive auxiliary power take-off means, which is disclosed herein as being operatively connected with the crank-shaft 15, so as to effect substantially complete utilization of power generated by the engine.

Referring now to Figure 1, gases from the surge tank 57 may be delivered to a turbine 83 for rotating its shaft 84 which might constitute a power take-off shaft for driving auxiliary mechanism. If desired, the shaft 84 may be connected, as shown, to the engine crank-shaft end 21 through a suitable gear train 85, 86, 87 and 88, and thereby transmit the power generated by turbine operation directly to the engine crank-shaft 15 for supplementing the power applied to said shaft through its direct connection with the combustion piston 32.

The engine hereindisclosed can be operated efficiently as a two-cycle reciprocating internal combustion engine fired by gas or gasoline and without use of the pressure control means. In such instance, the control housing 62 and the mechanism mounted therein is removed and replaced by a shallow cylinder head 91 (Figure 3) or it may be converted into a two-cycle internal combustion diesel gasifier engine by the substitution, for the control housing and its mechanism, of a substantially deeper cylinder head 89 (Figure 4). In the latter instance, the spark plug 37 will be replaced by a conventional fuel injection nozzle (not shown).

Referring again to Figure 1, the bearings for the crank-arms 25 and 26 on the crank-shaft 15 may be lubricated efficiently and positively by the provision of an oil ring 92 suitably connected by a feed line 93 with the oil pressure source and formed with an inner peripheral oil groove 94 in register with oil passages 95 leading one to each crank arm bearing. Furthermore, the location of the oil rings 41 on the lower extremity of the charging piston 39, is such that said rings never at any time during piston reciprocation move up into the area of the fuel inlet ports 44 in the cylinder sleeve 38. Accordingly, there is no suction, arising from the fuel flow through said ports, on the oil in the crank case 11, consequently, there is no leakage of oil through said ports and no loss of compression in the charging chamber 28.

It should be obvious that although the disclosure teaches utilization of the features of the invention in a two-cycle one cylinder reciprocating internal combustion engine, the engine may be of the multi-cylinder type with the cylinders in line, opposed or radial and with the crank-shaft horizontal, vertical or angularly disposed.

It is believed that my invention, its mode of construction and assembly, and many of its advantages should be readily understood from the foregoing without further description, and it should also be manifest that while preferred embodiments of the invention have been shown and described for illustrative purposes, the structural details are nevertheless capable of wide variation within the purview of my invention as defined in the appended claims.

What I claim and desire to secure by Letters Patent of the United States is:

1. In an internal combustion engine, the combination of a combustion chamber having an exhaust port, a charging chamber having first and second fuel inlet ports and a fuel outlet passage in communication with the combustion chamber, a valve in the second fuel inlet port, a piston reciprocable in said charging chamber, said piston being movable in one direction to first open the valve to admit fuel to the charging chamber through the second inlet port and to then open the first inlet port to admit a full charge of fuel to said charging chamber and permit closing of the valve, said piston being movable in the other direction to compress the fuel in the charging chamber, a movable cylinder head in the charging chamber adapted to increase and decrease the volumetric capacity of said chamber, reciprocable means in the combustion chamber, said reciprocable means being operable during the charging and compression stroke of the charging piston to close the outlet passage and the exhaust port and upon completion of the compression stroke of the charging piston to first open the exhaust port and then the outlet passage so as to admit compressed fuel from the charging chamber into the combustion chamber and exhaust expended gases, collection means for said exhaust gases, and means directly responsive to the pressure of the exhaust gases in said collecting means operable to move the movable cylinder head in the charging chamber.

2. In an internal combustion engine, the combination of a combustion chamber having an exhaust port, a charging chamber having a first fuel inlet port and a fuel outlet passage in communication with the combustion chamber, a valved auxiliary fuel inlet port in said outlet passage, a crank-shaft, a piston operably connected to the crank-shaft and reciprocable in said charging chamber, said piston being movable in one direction to first cause the auxiliary inlet port to open to admit fuel into the charging chamber and to then open the first inlet port to admit a full charge of fuel to said charging chamber and permit closing of the valved inlet port, said piston being movable in the other direction to compress the fuel charge, and reciprocable means in the combustion chamber operably connected to the crank-shaft and effective during a substantial portion of its stroke to close the outlet passage during the charging and compression strokes of the charging piston, said reciprocable means being operable to first open the outlet passage from the charging chamber to admit the compressed fuel into the combustion chamber, and to then compress the fuel in said combustion chamber.

3. In an internal combustion engine, the combination of a combustion chamber having an exhaust port, a charging chamber having a first fuel inlet port and a fuel outlet passage in communication with the combustion chamber, a second fuel inlet port in said outlet passage, a valve normally closing said second fuel inlet port, a piston reciprocable in said charging chamber, said piston being movable in one direction to first cause the said valve to open to admit fuel to the charging chamber, and to then open the first inlet port to admit a full charge of fuel to said charging chamber and permit closing of the valve, said piston being movable in the other direction to compress the fuel charge in the charging chamber, and a piston reciprocable in the combustion chamber and operable to close the outlet passage during the charging and compression strokes of the charging piston, the piston in the combustion chamber being then operable to open the outlet passage from the charging chamber to admit the compressed fuel into the combustion chamber.

4. In an internal combustion engine, the combination of a combustion chamber having an exhaust port, a charging chamber having a first fuel inlet port and a fuel outlet passage in communication with the combustion chamber, a valved auxiliary fuel inlet port in said outlet passage, a piston reciprocable in said charging chamber, said piston being movable in one direction to first cause the auxiliary inlet port to open to admit fuel to the charging chamber and to then open the first inlet port to admit a full charge of fuel to said charging chamber and permit closing of the valved inlet port, said piston being movable in the other direction to compress the fuel charge in the charging chamber, means in the charging chamber operable to control the compressive effect of the piston therein, and reciprocable means in the combustion chamber operable to close the outlet passage during the charging and compression strokes of the piston, said reciprocable means being positioned at the completion of the compression stroke of the piston to open the outlet passage from the charging chamber to admit the compressed fuel into the combustion chamber.

5. In an internal combustion engine, the combination of a combustion chamber having an exhaust port, a charging chamber having a first fuel inlet port and a fuel outlet passage in communication with the combustion chamber, a valved auxiliary fuel inlet port in said outlet passage, a piston reciprocable in said charging chamber, said piston being movable in one direction to first cause the auxiliary inlet port to open to admit fuel to the charging chamber and to then open the first inlet port to admit a full charge of fuel to said charging chamber and permit closing of the valved inlet port, said piston being movable in the other direction to compress the fuel charge in the charging chamber, and reciprocable means in the combustion chamber operable to close the outlet passage during the charging and compression strokes of the charging piston, said reciprocable means being positioned at the completion of the compression stroke of the charging piston to open the outlet passage from the charging chamber to admit the compressed fuel into the combustion chamber.

References Cited in the file of this patent

UNITED STATES PATENTS

| | | |
|---|---|---|
| 1,609,792 | Brock | Dec. 7, 1926 |
| 1,793,975 | St. Clair | Feb. 24, 1931 |
| 2,047,167 | Heller | July 7, 1936 |
| 2,097,883 | Johansson | Nov. 2, 1937 |
| 2,296,268 | Buchi | Sept. 22, 1942 |
| 2,303,794 | Pateras Pescara | Dec. 1, 1942 |
| 2,570,101 | Couling | Oct. 2, 1951 |
| 2,594,845 | Baumann | Apr. 29, 1952 |
| 2,901,885 | Reggio | Sept. 1, 1959 |

FOREIGN PATENTS

| | | |
|---|---|---|
| 513,166 | Italy | Feb. 3, 1955 |